April 25, 1967     O. HENKE ET AL     3,316,461
INSTALLATION STAND FOR DEVICES OF HIGHEST FREQUENCY
TECHNOLOGY, ESPECIALLY DIRECTIONAL RADIO EQUIPMENT
Filed Dec. 23, 1964     4 Sheets-Sheet 1

Inventors.
Oskar Henke, &
Alfred Lukas.
By Lill & Lill Attys.

April 25, 1967  O. HENKE ETAL  3,316,461
INSTALLATION STAND FOR DEVICES OF HIGHEST FREQUENCY
TECHNOLOGY, ESPECIALLY DIRECTIONAL RADIO EQUIPMENT
Filed Dec. 23, 1964   4 Sheets-Sheet 2

Inventors.
Oskar Henke, &
Alfred Lukas.
By S Lee & S Lee
Attys.

April 25, 1967 O. HENKE ETAL 3,316,461
INSTALLATION STAND FOR DEVICES OF HIGHEST FREQUENCY
TECHNOLOGY, ESPECIALLY DIRECTIONAL RADIO EQUIPMENT
Filed Dec. 23, 1964 4 Sheets-Sheet 3

Inventors.
Oskar Henke, &
Alfred Lukas.
By Lee & Lee
Attys.

United States Patent Office 3,316,461
Patented Apr. 25, 1967

3,316,461
INSTALLATION STAND FOR DEVICES OF HIGHEST FREQUENCY TECHNOLOGY, ESPECIALLY DIRECTIONAL RADIO EQUIPMENT
Oskar Henke, Munich, and Alfred Lukas, Munich-Aubing, Germany, assignors to Siemens & Halske Aktiengesellschaft Berlin and Munich, Germany, a corporation of Germany
Filed Dec. 23, 1964, Ser. No. 420,830
Claims priority, application Germany, Dec. 30, 1963,
S 88,923
8 Claims. (Cl. 317—120)

The invention relates to a stand for apparatus units in the electrical communication field, especially a cabinet stand or rack with devices for the reception of apparatus units, utilizing connection panels for the electrical connection of the apparatus units, with supply lines, as well as possibly for the connection with additional cooperable apparatus units, in which the individual apparatus units are constructed in the form of elongated housing parts, which are supported in the stand adjacent to one another.

In installation stands of this type, the individual apparatus parts and structural elements are in most cases grouped into cabinet racks, which carry on their rear closure wall or plate, plug contact strips for the supply and lead-off of signal and supply voltages. In such cabinet racks, which contain hollow conductor structural parts, as, for example, in transmitting or receiving units for highest-frequency technology, there arise, however, difficulties in arrangement through the fact that the required high frequency line connections, for example, hollow conductor connections, (in which a plug-in type of construction does not fulfill all the requirements) are provided with flanges having screws which must at all times be made accessible. In a stand in which at least two such hollow conductors must be provided, namely one for a transmitter and one for a receiver, necessarily one of the high-frequency lines must be conducted through structural groups or cabinet racks. There results therefrom, besides considerable difficulties in assemblage, long high-frequency lines with, under some circumstances, appreciable losses. There has become known a constructional arrangement for apparatus in the microwave field, in which the individual hollow conductor elements, such as filters, couplers, mixing stages and their hollow conductor connections are grouped together in a closed block. Moreover, an arrangement is known in which the hollow conductor flanges are simultaneously used for mechanical support and attachment, as well as for electrical connection. Even with use of both measures, the above mentioned difficulties with respect to assemblage, interchangeability of constructional elements and of spatial arrangement are not avoided.

The invention has as its problem that of eliminating the cited drawbacks of known arrangements, with avoidance of assemblage difficulties.

This problem is solved according to the invention in a stand or rack of the type heretofore referred to, through the feature that in apparatus units which contain highest-frequency constructional parts with coaxial and/or hollow lines, the highest-frequency line connections are arranged in the upper zone of the particular housing and within the housing the highest-frequency conductor parts and the other constructional elements of the apparatus unit are so arranged that they extend toward the lower end of the apparatus casing, corresponding to their functional sequence.

It is advantageous for the centering of the individual apparatus housing and/or of the line connections, to provide centering bolts and sleeves between the rack and the individual apparatus housings which are arranged preferably in rigid mechanical allocation to the highest-frequency line connections.

The individual apparatus unit forms, in an advantageous manner a compact and functional constructional group, such as a transmitter, a receiver, a modulator or a demodulator.

It is expedient in a rack frame, in particular, to arrange four apparatus units next to one another, maintaining small lateral interspaces. Advantageously, connections of the high-frequency lines are conducted in the upper part of the apparatus units directly to the highest-frequency amplifier devices arranged therein.

If a traveling wave tube is used in the highest-frequency amplifier, then it is especially advantageous to mount the tube with its axis extending in the general direction of the longitudinal axis of the apparatus unit, in particular obliquely inclined forward and with the electron collector disposed adjacent the top, in such a way that it may be easily interchanged.

For the suspension and securing of the apparatus unit in the rack it is advantageous to provide a front in the rack, from which the highest-frequency connections extend. On this frame and in the upper part of the apparatus unit, means are provided which make it possible to initially suspend the apparatus unit so as to extend obilquely in the frame, and from which it may be swung into place, especially into engagement with two bolts or studs which serve simultaneously for the fastening of the apparatus unit and for the centering of connection sleeves of the apparatus unit on the high-frequency line connection arranged in the frame and/or on a plug-in connection strip.

Such an arrangement and fastening of the units in the rack produces the following advantages over cabinet racks or units which are subdivided predominantly in horizontal direction.

The individual units, for example, transmitter, receiver, modulator or demodulator can be arranged next to one another in any desired sequence without the requirement that the length of a high-frequency feed line, especially of a hollow conductor, thereby has to be made longer than absolutely necessary. Since the high-frequency input or output can always be connected above, the high frequency lines at the rack side, serving for the connection of the units, are very short. Thereby in every case there is achieved a low attenuation of the electromagnetic waves.

The overall length of a high-frequency constructional group, as for example, the successive connection of amplifier means, mixing stage, filter, dividing filters, directional coupler and the like, is no longer limited to the standardized installation width. With horizontal subdivision of cabinet racks it was frequently necessary to subdivide a unit into several cabinet racks. The expenditure in parts for the side-by-side attachment of the cabinet racks and the expenditure in connecting lines is thereby considerably reduced.

In the solution according to the invention, the constructional parts can be arranged one next to the other, according to their electrical functions, with a longitudinal extension of the housing, which is extremely advantageous, especially in the case of hollow conductors. The bends and deflection lines otherwise frequently necessary can thereby be avoided, which results in a low attenuation of the electromagnetic energy. Additionally there is achieved thereby a spatially compact construction.

If in a unit, especially for the intermediate frequency apparatus parts, printed circuit plates with standardized dimensions are to be used, the width and depth of the oblong housing can be adapted to these structural groups.

At least, the width of the housing can be selected as a whole multiple of the width of such a flat constructional group. It is thereby possible to arrange next to one another in vertical sequence, high and highest-frequency structural groups and flat constructional groups.

If in a rack four housings are arranged next to one another, under some circumstances, necessary high-frequency connections can be made between the individual units, in the least favorable case, only over two units which are not involved in the connection. Through such short connecting lines there again results a low attenuation.

A space or gap between the individual units, which extends in perpendicular direction, over their entire length, favors the lead-off of heat from the constructional groups. In the narrow shafts so formed, however, it is also possible to accommodate air ducts for a forced convection, or connecting cables.

The fastening device provided for the casing and the apparatus units presents, moreover, considerable advantages in the assemblage and in particular in the changing of a unit, as is clearly apparent from the following description.

In the drawings, wherein like reference characters indicate like or corresponding parts:

FIG. 1a is a front elevational view of an installation stand or rack embodying the invention;

FIG. 1b is a vertical sectional view taken approximately on the line 1b—1b of FIG. 1a;

FIG. 1c is a vertical sectional view taken approximately on the line 1c—1c of FIG. 1a;

FIG. 2 is a vertical sectional view taken approximately no the line 2—2 of FIG. 1a;

FIG. 3 is a vertical sectional view taken approximately on the line 3—3 of FIG. 1a;

FIG. 4b is a perspective view of the upper portion of an apparatus unit, illustrating the structure thereof cooperable with that illustrated in FIG. 4a;

Figure 1C:
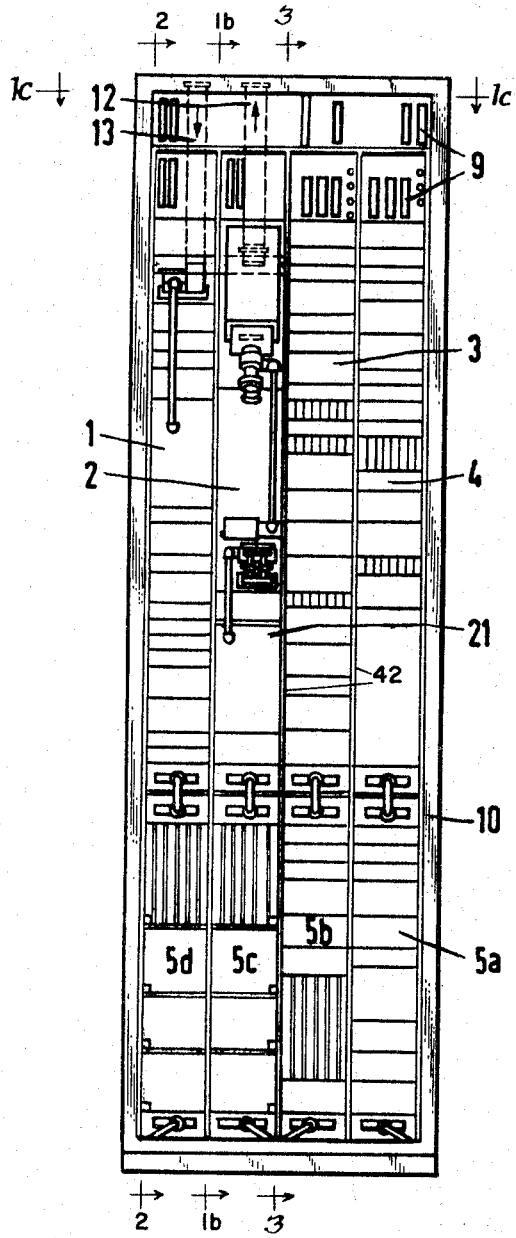
Figure 1C:
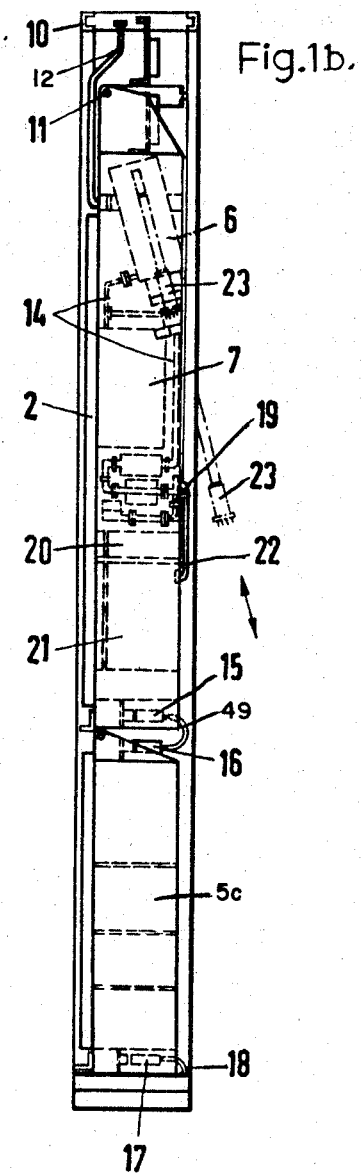
Figure 1C:
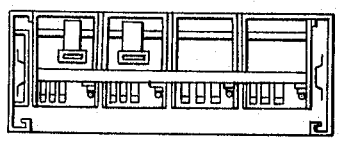

FIG. 1 illustrates an installation stand or rack 10 for highest-frequency engineering, especially directional radio engineering, in which the casings 1, 2, 3, 4 and 5, each containing an apparatus unit, are presented in a mounted condition. Each apparatus unit forms a closed-off or segregated and functional constructional group, such as a transmitter, a receiver, a modulator or a demodulator. Preferably, four apparatus units are located in a stand adjacent to one another, as for example two transmitters and two receivers, or transmitter, modulator, receiver and demodulator. Each apparatus unit is situated in an elongated vertically extending housing which is provided in the zone of the upper end with a fastening device 11. The form of this housing will be particularly apparent from the cross section of FIG. 2 which is taken through the installation stand approximately in the plane of a side wall of the apparatus unit. In FIG. 1a high-frequency line conductors 12 and 13, coming, for example, from the antennas, for units 1 and 2, are represented in broken lines. These lines consist in the embodiment illustrated, of hollow conductors, but could also be designed as coaxial conductors or the like. From the cross section of FIG. 1b, it is apparent that the hollow conductor 12 is introduced in the upper part of the rack 10 into the apparatus unit 2.

From the hollow conductor connection there leads a short conduction (line) piece to the output of a high-frequency amplifier 6, which is equipped with a traveling wave tube 23. The input signal for the amplifier is led in over a high-frequency line 14. The constructional unit 7 forms the high-voltage main supply device for the traveling wave tube. Onto the line 14 there are connected, for example, directional coupler, filter and other constructional units, which are necessary for a transmitter unit, in perpendicular direction corresponding to their functional sequence. In the lowest part of the casing there is situated, finally, a connector-plug unit 15 which connects the apparatus unit 2 over the line 49 and another connector-plug combination 16 with the apparatus unit 5. The unit 5 is perpendicularly arranged below the unit 2 and contains, for example, an apparatus for the generation of the supply voltages for the apparatus unit 2. It is built up in the same general manner as the unit 2 situated thereabove. The pertinent current supply or signal lines and the like are brought in over the connector-plug combination 17 and the rack cable 18.

Figure 4A:
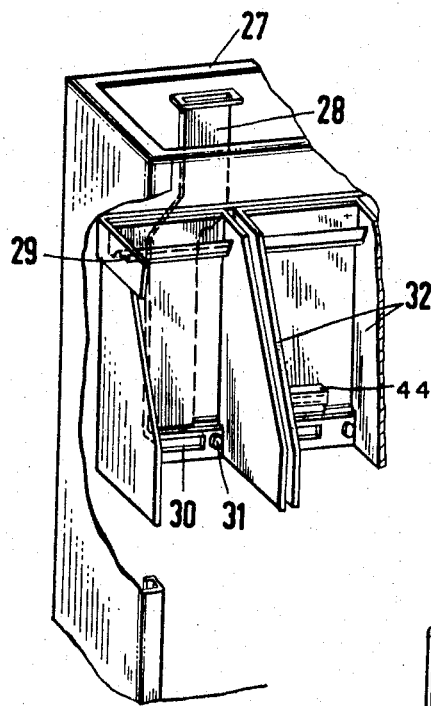
FIG. 4a is a perspective view of the upper portion of the rack, illustrating the mounting structure for an apparatus unit.
Figure 4B:
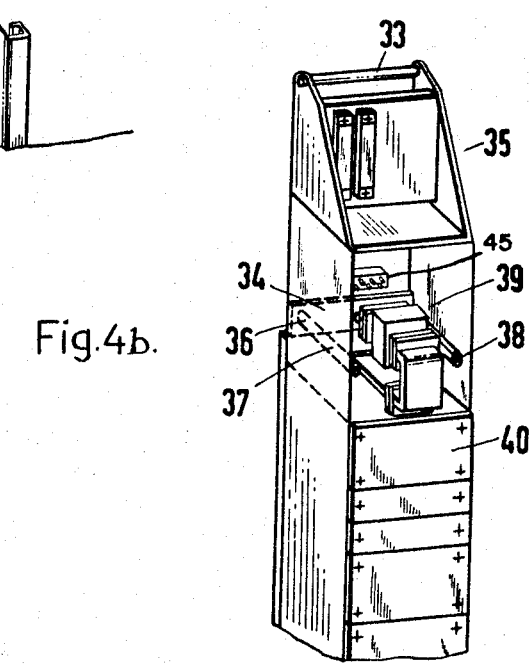

Additional connector-plug combinations, with plug-in contact strips on the casing side, can be mounted in the upper part of the casing for the apparauts units 1, 2, 3 and 4, preferably in the immediate environment of the high-frequency line connection. One part 44 of such a connector-plug combination is illustrated in FIG. 4a located above the hollow conductor flange and the corresponding part 45 thereof is illustrated in FIG. 4b. Over this connector-plug combination there can be fed supply voltages, for example, particularly signal lines for the stand signalizing situated above.

It is expedient to maintain some lateral separation between the individual units which are secured in a rack, so that a space remains between the individual housing walls of the units. Such narrow shaft-like openings 42 can be clearly seen in FIG. 1 between the individual apparatus units 1, 2, 3, 4 and 5a, b, c, d. Since such spaces extend over the entire height of the rack, they facilitate the dissipation of heat from the units. This can be additionally promoted by forming the spaces in the shape of a duct and connecting it with a cool-air system utilizing a blower. Advantageously, cables too, can be accommodated in such spaces.

Uppermost in the rack 10 there are also accommodated, connector-plug units 9 for monitoring or signaling lines for the connection of the rack to the exchange or station. Such connector-plug units are also located in the upper part of the housing units 1 to 5. The connector-plug units also contain coaxial conductor connections, etc.

The individual constructional groups which are illustrated especially in cross section by the unit 2 in broken lines, may also be constructed for a plug-in type of assembly and be equipped with printed circuit plates or boards. In the cross section of FIG. 1b there is illustrated a high frequency line which, for example, may consist of the following units: A traveling wave amplifier 6, which is connected over the line 14 and over a filter, directional line and frequency converter 19 with an intermediate frequency amplifier 20 having a plug-in type of construction. An oscillator 21, likewise having a plug-in construction, is connected over a high-frequency line 22 with the converter. In order to preserve clarity in the drawing, the plug-in constructional groups are not illustrated. They consist primarily of flat closed casings, usually completely shielded, which are equipped with printed circuit plates. All the connections of these constructional units are conducted to plug-in connector units mounted at the rear. The corresponding counterparts of such connector plugs are fastened in the bottom of the housing of the cooperable apparatus unit. The fastening frequency is not rigid, but made with some play, in order to equalize tolerances in the fastening devices of such constructional units. The fastening and assemblage of the constructional units is accomplished with utilization of usual cabinet rack techniques, that is, with slide members or skids, mounted laterally on the constructional unit, which are slid on slide rails into the housing of an apparatus unit. After the insertion, the constructional unit is fixed in place in the casing with screws. The width of the apparatus units, for example, of the apparatus unit 1 is now adapted to the width of the plug-in constructional groups, that is, it is about equal to the standardized width of a printed circuit plate or a multiple of such a width.

As is apparent from the figures, such circuit plates can be accommodated, either grouped together into constructional groups, or singly in any desired sequence in the housing of an apparatus unit. The arrangement advantageously is so selected that high-frequency constructional parts and plug-in constructional groups are arranged in the sequence of their electrical function, extending in vertical sequence in the apparatus unit. In the example of the invention illustrated, predominantly high-frequency-shielded plug-in constructional groups were employed, that is, circuit groupings of printed conductor plates which are disposed in a shielding housing.

Since in the high-frequency transmitted, following the frequency converter 19, there is frequently performed an amplification of the transmission energy with the aid of a traveling wave tube, such an amplifier unit being illustrated in dotted lines in FIG. 1b, and in the elevation of unit 2 shown in FIG. 1. It is of advantage for the rapid interchangeability of the traveling wave tube 23 accommodated in the unit 6, if, as is apparent, the arrangement is so made that the traveling wave tube is secured in a forwardly obliquely inclined position within the casing of the unit. It has proved especially advantageous to so mount the traveling wave tube socket that the tube itself can be withdrawn by a downward and outward movement, or inserted into the socket by a reverse movement. With such installation position, the collector of the tube, which generates the greater part of the loss heat, is arranged in the highest part of the casing, so that in an advantageous manner it exercises the least influence on the temperature of the other parts of the apparatus unit. In FIG. 1b the position of the tube before insertion also is shown, the insertion and extraction direction, which is indicated by a double arrow.

Figure 2:
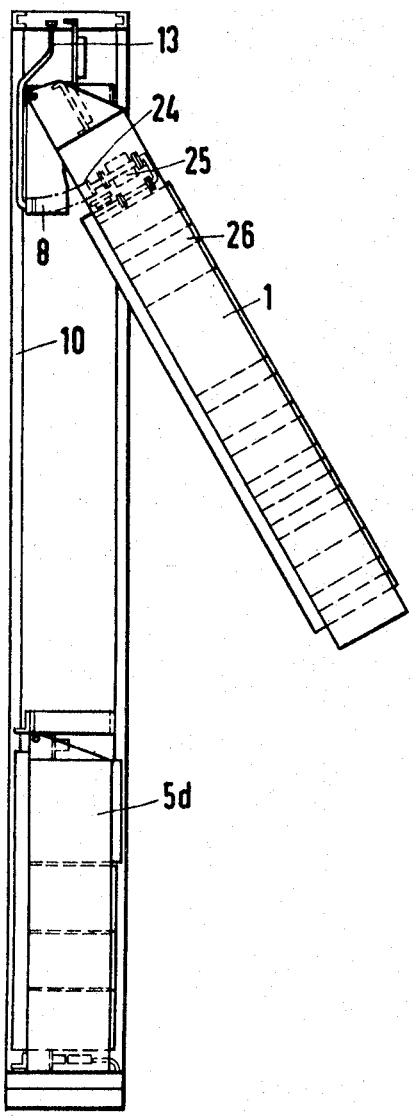

FIG. 2 illustrates a cross section through the rack 10 of FIG. 1, in which an apparatus unit 1 is provided with a hollow conductor flange, inclined obliquely outward, before the insertion into the stand 10. A hollow conductor 13 is connected over the flange 8, following insertion of the apparatus unit, with the flange 24, which leads to the further hollow conductor constructional elements 25 and, finally, to units 26, which are equipped with printed circuit plates. In the lower part of the rack there is represented another unit 5d, which is shown in its inserted position. This unit may contain, for example, the current supply devices.

Figure 3:
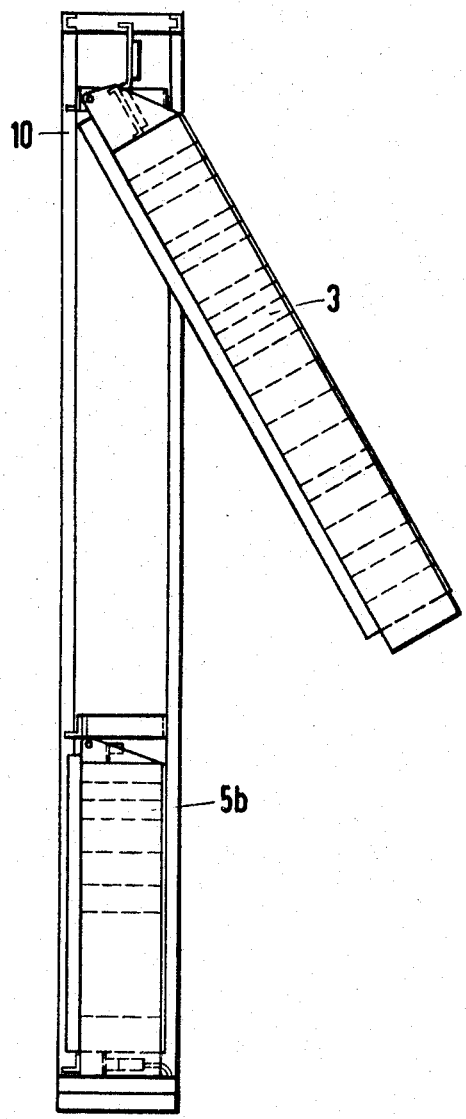

FIG. 3 illustrates, in the same assemblage condition, that is, before the insertion of the apparatus unit, a longitudinal section through the stand 10 at the location of unit 3, which in the example presented contains no high-frequency energy lines and construction parts belonging thereto. In the lower part of the rack there is visible the apparatus unit 5b of FIG. 1. This serves, as already explained, preferably for the current supply of the apparatus unit 3 situated above it.

Figure 6:
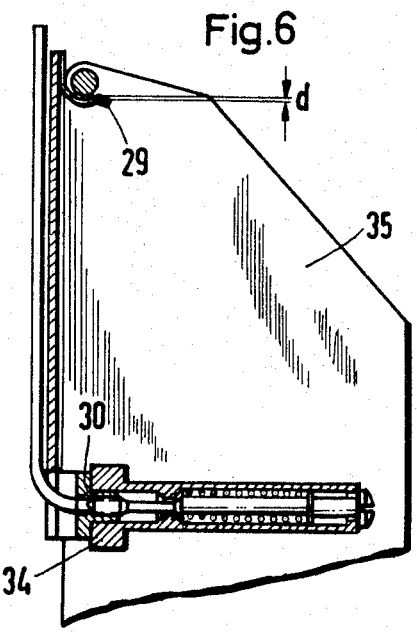
FIG. 6 is a view similar to FIG. 5, showing the disposition of the various portions upon completion of the installation.

For the clarification of the receiving device according to the invention, particularly the construction of the housing or casing of an apparatus unit, reference is made to FIGS. 4 and 6, which illustrate apparatus units provided with hollow conductors. FIG. 4a illustrates the construction of the suspension device on the rack for an apparatus unit, while FIG. 4b illustrates the cooperable structure of the unit. In the rack 27 there are arranged channel or shaft-shaped securing devices for two apparatus units. Each fastening device comprises a U-shaped member 32, to which there is attached, adjacent the upper edge, a plate 29 bent in channel form. The member 32 is fastened in the rack frame by screws or other connecting means (not shown). The hollow conductor 28, which extends into the rack frame from the top thereof, terminates at a flange piece 30. Laterally adjacent the flange there are arranged short studs or bolts 31, with which the flange piece 34 of the unit housing is engaged following insertion of the housing 35. As illustrated in FIGS. 2 and 3, however, the housing 35 is first suspended in oblique position with the aid of a transverse bar 33 in a channel 29. In the housing 35, the details 39 represent hollow conductor constructional parts, which close onto the flange piece 34, and constructional units 40 which, for example, again may be executed as closed plug-in constructional groups. On both sides laterally of the hollow conductor flange on the unit there are sleeves 36 for reception of the centering bolts 31 on the rack. The sleeves are extended forwardly as shells 37 to the front face of the housing 35 and provided with long screws 38.

Figure 5:
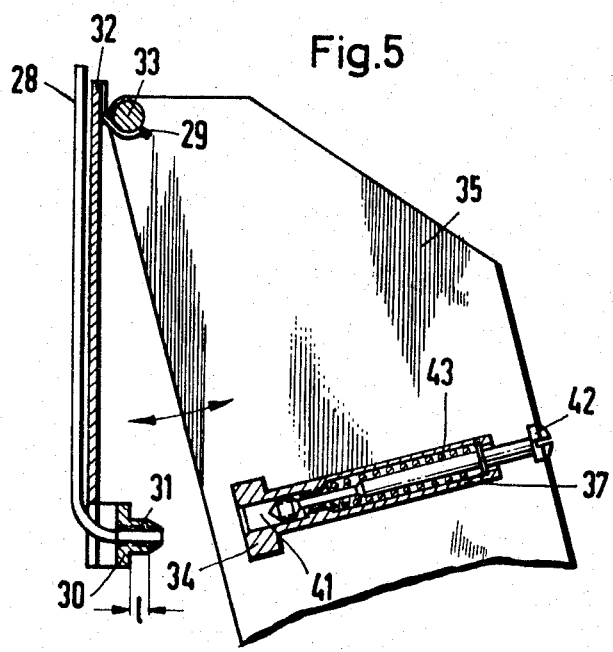
FIG. 5 is a vertical sectional view through the mounting structure of FIG. 4a and an apparatus unit such as illustrated in FIG. 4b, showing the apparatus unit in its initial installational position.

For a clear understanding of this suspension and fastening device for the apparatus units, reference is made to FIGS. 5 and 6, which illustrate the details necessary for the positioning of the housings, as illustrated in FIGS. 2 and 3. The hollow conductor 28 terminates at its lower end in a connection flange 30 rigidly connected with the member 32, which carries the short centering studs 31 heretofore referred to. The length of such centering studs is such that a self-obstruction of the unit on insertion is prevented. These studs, as illustrated in FIGS. 5 and 6, are each provided at their front end with a bevel for the easier placement of the cooperable unit flange member. The flange member 34 also has a cooperable slight inwardly extending bevel.

On the part 32 there is to be noted from FIG. 4a, moreover, the channel-shaped metal strip 29, and on the housing 35, the transverse bar 33 rigidly secured thereto. The unit flange 34 has a socket-shaped recess 41, which as guide shell 37 is moved toward the flange 30, may receive the cooperable stud 31. In the shell there is coaxially arranged a screw 42, which is non-detachably held. The spring 43, the action of which is limited by a stop, urges the screw toward its unscrewed position and simultaneously acts as centering means for the screw 42 in the shell 37. Through this measure it becomes unnecessary, in the final stages in the securing unit, to make a relatively long search for the threaded bore in the centering studs and an external threading of the screws into the studs thus is avoided.

FIG. 6 illustrates the parts of FIG. 5 following the insertion and tightening down of the casing. After the tightening of the screw connections in the connection flange 34 on the apparatus unit housing 35 with the rack flange 30 there is established between the two flange connections the necessary contact pressure for the electrical connection. Simultaneously, as will be apparent from FIG. 6, bar 33 of the latter takes up the weight of the unit 35, whereby the member is lifted a short distance d above the channel-shaped member 29. The studs simultaneously center the two flange connections, and in a very simple manner, merely by the tightening of only two screws, the high-frequency contacting and the mechanical connection between stand and elongated apparatus unit is achieved.

Changes may be made within the scope and spirit of the appended claims which define what is believed to be new and desired to have protected by Letters Patent.

We claim:

1. A stand for receiving and supporting apparatus units of electrical communications technology comprising a rack structure, a plurality of elongated casings, means for mounting each apparatus unit in a respective casing with a highest frequency input of each apparatus unit at a top end of a respective casing, each apparatus unit being formed of conductor elements and conductor connections grouped together in a closed block and consisting of a functionally complete and whole unit capable of separate functionality with respect to one another and having the elements thereof arranged from top to bottom in functional succession with the uppermost element having the highest frequency input with respect to the other elements, means for mounting said casings vertically within said rack structure and horizontally adjacent one another, and an input conduit having an end portion connected at the top end of one of said casings to the highest frequency input and including means for electrically connecting one end of said conduit to the highest frequency electrical input of the respective apparatus unit and for mechanically supporting the respective apparatus unit in the respective casing when the respective apparatus unit is fully inserted into the respective casing.

2. The stand as defined in claim 1 wherein said means for mounting said casings includes a stud secured to said rack structure and having a conically shaped end portion, a cooperating socket secured to each of said casings for receiving said stud therein.

3. The stand as defined in claim 2 including a channel member secured to said rack, a bar secured to each casing and cooperable with said channel member for suspending said casing in said rack during insertion of said casing therein, said channel member being positioned with respect to said stud and said bar being positioned with respect to said socket such that engagement of said stud and socket separates said bar from said channel member a relatively small distance.

4. The stand as defined in claim 2 wherein said socket is elongated and extends across a width of a respective casing to a front portion thereof, said stud having a threaded aperture therein, and a screw disposed in said socket and receivable in the threaded aperture.

5. The stand as defined in claim 1 including current supply devices each housed in a respective casing, a plurality of connector-plug units, a first and second of said plug units being mounted in opposite upper and lower ends respectively of said casings housing said supply devices, a third of said plug units being mounted at a lower end of a respective casing housing the respective apparatus unit, means electrically connecting said first and third plug units, and said second plug unit being adapted for connection to a main supply.

6. The stand as defined in claim 1 wherein one of the apparatus units includes a travelling wave tube and means for mounting said travelling wave tube in a substantially vertical line with a bottom end thereof inclined obliquely forward in the respective casing and having a collector thereof disposed at an upper end thereof.

7. The stand as defined in claim 6 including a connector-plug unit mounted in the upper end of said rack adjacent the end portion of said input conduit and a corresponding connector-plug unit mounted in the top end of said one casing.

8. A stand for receiving and supporting apparatus units of electrical communications technology comprising a rack structure, a plurality of elongated casings, means for mounting the apparatus units in said casings, means for mounting said casings vertically within said rack structure and horizontally adjacent one another, at least one of the apparatus units includes a travelling wave tube, means for mounting said travelling wave tube on a substantially vertical line with a bottom end thereof inclined obliquely forward in the respective casing and having a collector disposed at an upper end thereof.

References Cited by the Examiner
UNITED STATES PATENTS

| | | | |
|---|---|---|---|
| 2,904,725 | 9/1959 | Lebedinsky | 317—120 X |
| 2,997,629 | 8/1961 | Wolski | 317—120 |
| 3,020,450 | 2/1962 | Shafer | 317—99 |

ROBERT K. SCHAEFER, *Primary Examiner.*

D. SMITH, JR., W. C. GARVERT, *Assistant Examiners.*